US012801083B2

(12) United States Patent
Seo et al.

(10) Patent No.: US 12,801,083 B2
(45) Date of Patent: Nov. 17, 2026

(54) PRISM AND APPARATUS FOR MANUFACTURING DIFFRACTIVE OPTICAL ELEMENT HAVING INCLINED REFLECTING SURFACE

(71) Applicant: LG Chem, Ltd., Seoul (KR)

(72) Inventors: Dae Han Seo, Daejeon (KR); Bu Gon Shin, Daejeon (KR); Chang Yoon Lim, Daejeon (KR); So Young Choo, Daejeon (KR); Hyun Joo Son, Daejeon (KR)

(73) Assignee: LG Chem, Ltd., Seoul (KR)

( * ) Notice: Subject to any disclaimer, the term of this patent is extended or adjusted under 35 U.S.C. 154(b) by 239 days.

(21) Appl. No.: 18/579,704

(22) PCT Filed: Jul. 15, 2022

(86) PCT No.: PCT/KR2022/010328
§ 371 (c)(1),
(2) Date: Jan. 16, 2024

(87) PCT Pub. No.: WO2023/287237
PCT Pub. Date: Jan. 19, 2023

(65) Prior Publication Data

US 2024/0319668 A1 Sep. 26, 2024

(30) Foreign Application Priority Data

Jul. 16, 2021 (KR) ........................ 10-2021-0093488

(51) Int. Cl.
*B29D 11/00* (2006.01)
*G02B 5/04* (2006.01)
(Continued)

(52) U.S. Cl.
CPC ....... *G03H 1/041* (2013.01); *B29D 11/00769* (2013.01); *G02B 5/04* (2013.01);
(Continued)

(58) Field of Classification Search
CPC ...... B29D 11/00769; G02B 5/04; G02B 5/18; G02B 5/1857; G02B 5/32;
(Continued)

(56) References Cited

U.S. PATENT DOCUMENTS 5,895,927 A * 4/1999 Brown .................. G01B 11/12
250/559.22
2007/0211342 A1 9/2007 Komatsu et al.
(Continued)

FOREIGN PATENT DOCUMENTS

CN 100507615 C 7/2009
CN 101510070 B 5/2014
(Continued)

OTHER PUBLICATIONS

International Search Report for Application No. PCT/KR2022/010328 mailed Nov. 8, 2022, pp. 1-4.
(Continued)

*Primary Examiner* — Ryan S Dunning
(74) *Attorney, Agent, or Firm* — Lerner David LLP

(57) ABSTRACT

The present disclosure provides an apparatus for manufacturing a diffractive optical element, the apparatus including: a prism for manufacturing a diffractive optical element, the prism comprising a photoreactive material attachment surface and a light reflecting surface inclined at a predetermined angle from the photoreactive material attachment surface; and a light source positioned at the opposite side of the prism with respect to the photoreactive material attached to the photoreactive material attachment surface, and configured to irradiate light toward the photoreactive material, and a method for manufacturing a diffractive optical element.

15 Claims, 4 Drawing Sheets

(51) Int. Cl.
*G02B 5/18* (2006.01)
*G03H 1/04* (2006.01)
*G02B 5/32* (2006.01)

(52) U.S. Cl.
CPC .............. *G02B 5/18* (2013.01); *G02B 5/1857* (2013.01); *G02B 5/32* (2013.01); *G03H 2001/0439* (2013.01); *G03H 2001/0441* (2013.01); *G03H 2001/0473* (2013.01); *G03H 2223/18* (2013.01); *G03H 2227/04* (2013.01)

(58) Field of Classification Search
CPC ... G03H 2001/026–0268; G03H 1/041; G03H 2001/0439; G03H 2001/0441; G03H 2001/0473; G03H 1/30; G03H 2223/18; G03H 2227/04
See application file for complete search history.

(56) References Cited

U.S. PATENT DOCUMENTS

| | | | | |
|---|---|---|---|---|
| 2018/0045962 | A1* | 2/2018 | Inagaki | G02B 5/32 |
| 2018/0275605 | A1* | 9/2018 | Zheng | G02B 27/12 |
| 2019/0011880 | A1* | 1/2019 | Rewitz | G03H 1/0248 |
| 2020/0183162 | A1 | 6/2020 | Deng | |

FOREIGN PATENT DOCUMENTS

| | | | |
|---|---|---|---|
| JP | H0916059 | A | 1/1997 |
| JP | H1154079 | A | 2/1999 |
| JP | H11307803 | A | 11/1999 |
| JP | 2001265200 | A | 9/2001 |
| JP | 2002149044 | A | 5/2002 |
| JP | 2002175001 | A | 6/2002 |
| JP | 3423056 | B2 | 7/2003 |
| JP | 2007160775 | A | 6/2007 |
| JP | 2011197403 | A | 10/2011 |
| JP | 2018538580 | A | 12/2018 |
| KR | 20190044334 | A | 4/2019 |
| KR | 20190102557 | A | 9/2019 |

OTHER PUBLICATIONS

Search Report dated Apr. 17, 2026 from the Office Action for Chinese Application No. 202280054126.X issued Apr. 23, 2026, pp. 1-3.

* cited by examiner

[FIG. 1]
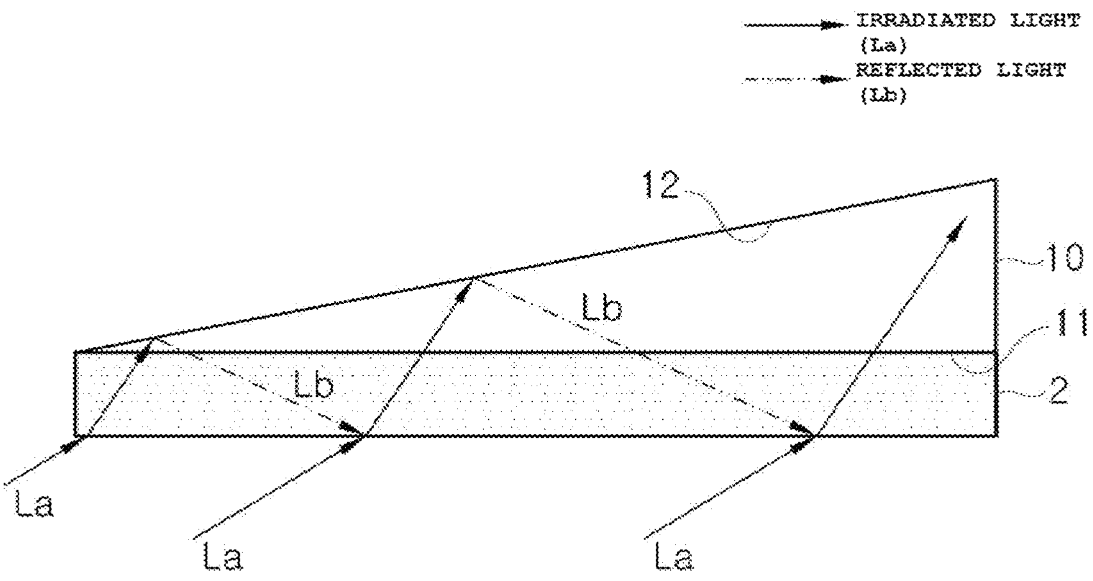
[FIG. 2]
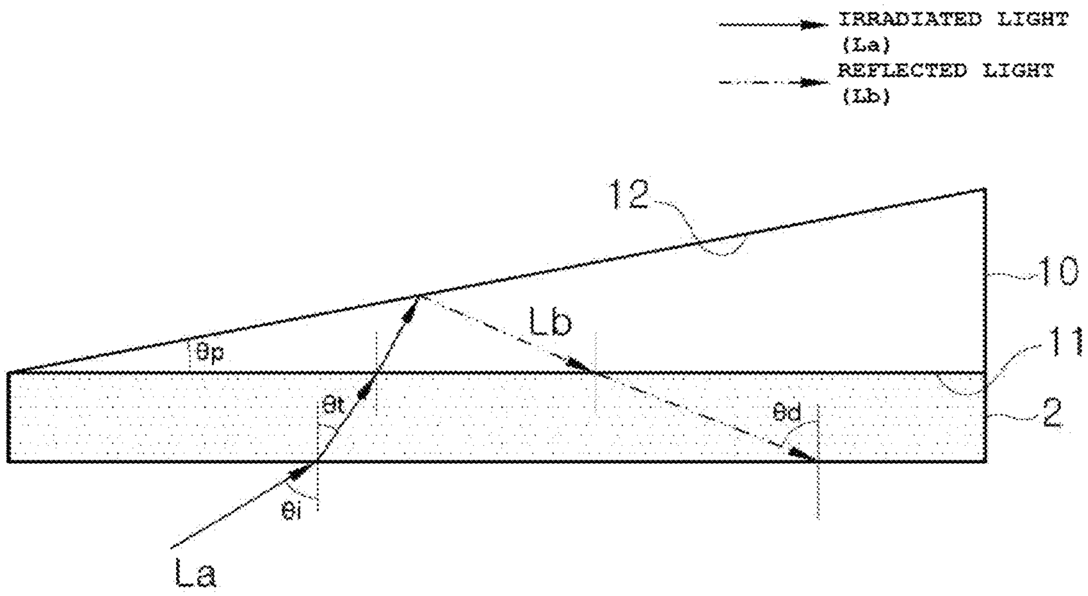

[FIG. 3]
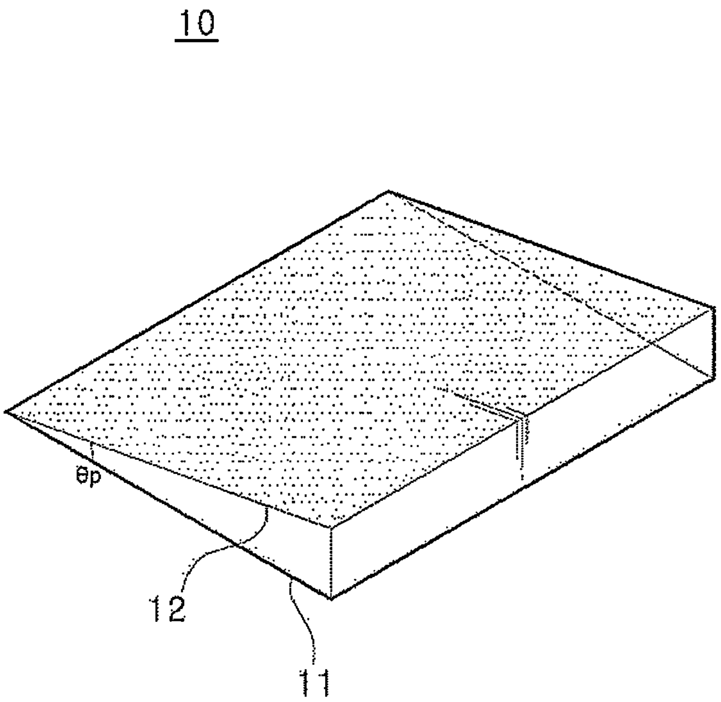
[FIG. 4]
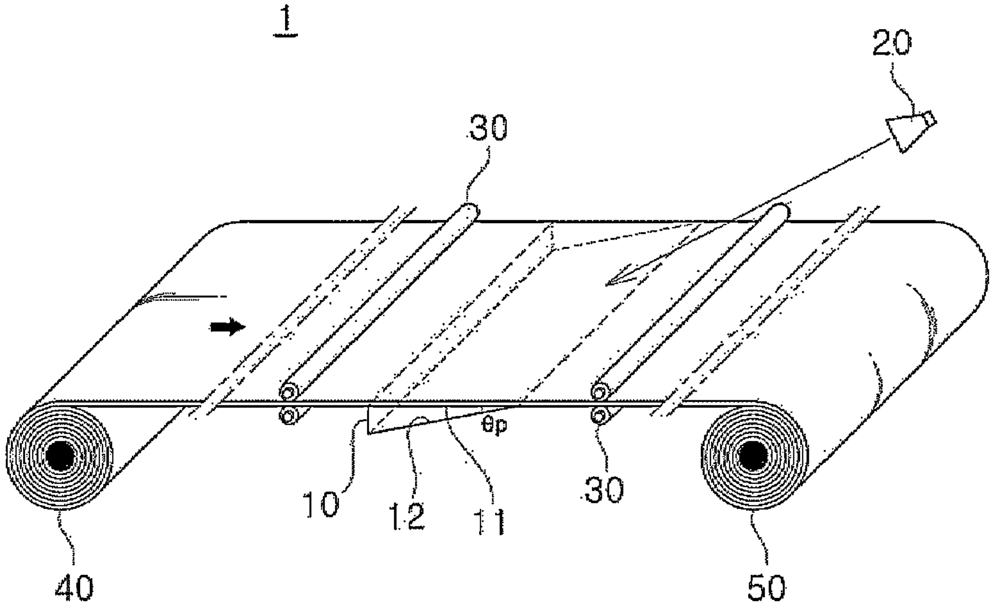

[FIG. 5A]
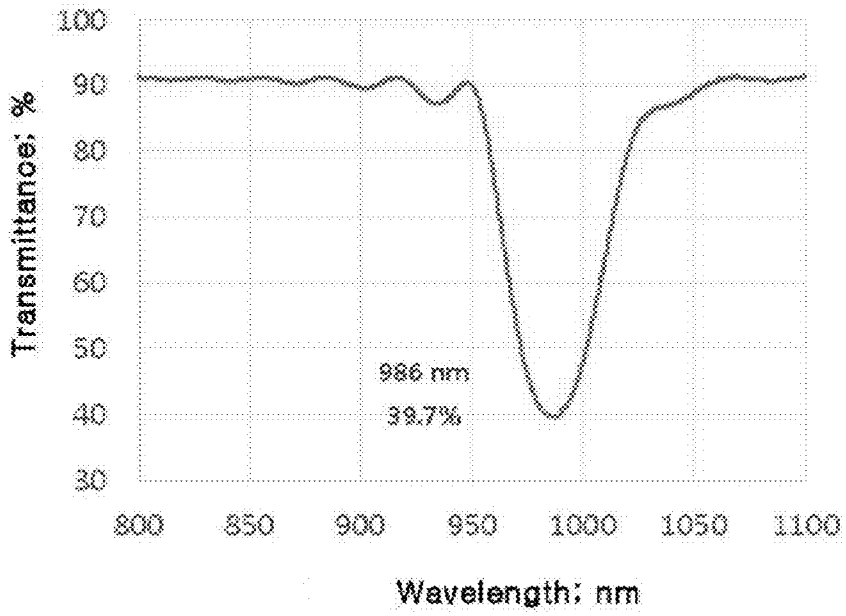
[FIG. 5B]
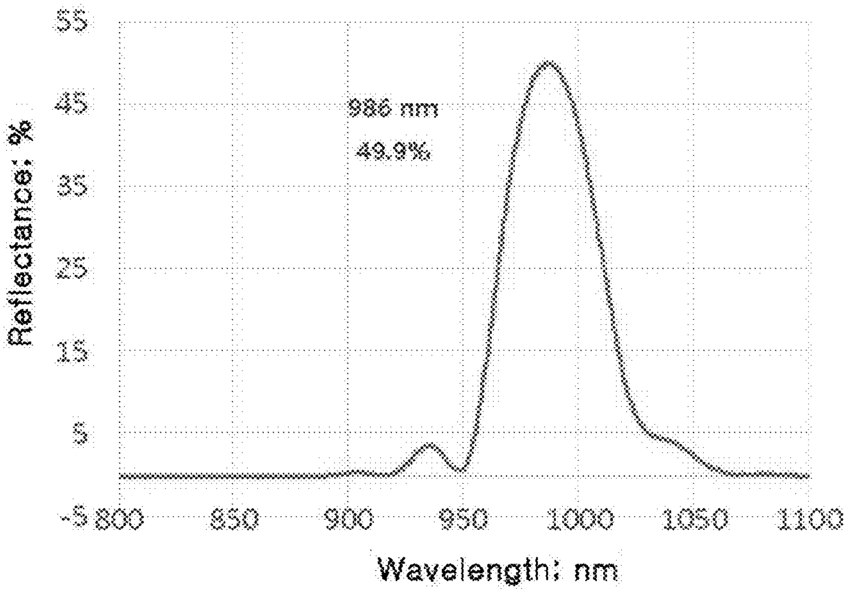

[FIG. 6A]
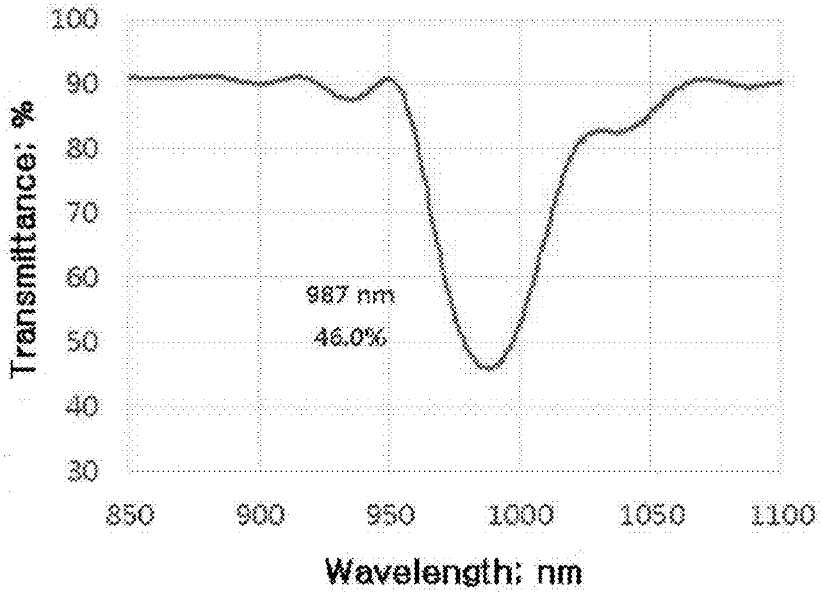
[FIG. 6B]
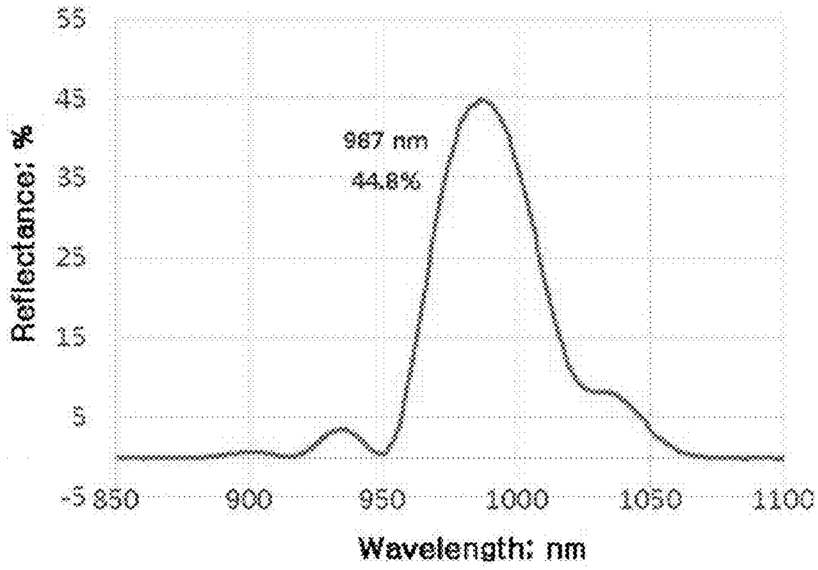

PRISM AND APPARATUS FOR MANUFACTURING DIFFRACTIVE OPTICAL ELEMENT HAVING INCLINED REFLECTING SURFACE

CROSS-REFERENCE TO RELATED APPLICATIONS

This application is a national stage entry under 35 U.S.C. § 371 of International Application No. PCT/KR2022/010328, filed on Jul. 15, 2022, which claims priority to Korean Patent Application No. 10-2021-0093488, filed on Jul. 16, 2021, the disclosures of which are hereby incorporated herein by reference in their entireties.

TECHNICAL FIELD

The present specification claims priority to and the benefit of Korean Patent Application No. 10-2021-0093488 filed in the Korean Intellectual Property Office on Jul. 16, 2021, the entire contents of which are incorporated herein by reference.

The present disclosure relates to an apparatus and method for manufacturing a diffractive optical element, and more particularly, to an apparatus and method for manufacturing a diffractive optical element using a prism including a light reflecting surface.

BACKGROUND ART

A diffractive optical element such as a holographic optical element is manufactured by allowing two laser beams to interfere with each other, the two laser beams having the same wavelength and coherent length in a photoreactive material.

When a diffractive optical element is manufactured using two laser beams, it is greatly affected by an external environment such as vibration or air flow, which frequently causes a problem with the reproducibility of the manufactured diffractive optical element.

As an alternative, after a master is manufactured in advance, a technique for replicating a diffractive optical element with a single laser beam using the master has been developed, leading to mass production of the diffractive optical element.

One laser beam is diffracted by the master to generate regenerated light, and the original laser beam and regenerated light by the master interfere in the photoreactive material to undergo a process of replicating the same diffractive optical element as the master. The following problems have been continuously raised.

First, it has not been easy to set up an optical system for manufacturing the master and control the external environment, and it has been difficult to enlarge the master itself due to the limitations of a laser beam source and the optical system. Although it has been essential to increase the area of the master for mass production, the master that can be manufactured only has a maximum one-side length of 100 mm so that several masters have been used in a state that they have been attached to a master plate in a tile attachment method.

In this case, it has been necessary to manufacture uniform masters quantities, and continuous in large production has been required due to the nature of the master, which is a consumable. In order for the replicated diffractive optical element to maintain consistent optical performance, the master should be made larger than the replicated diffractive optical element, which causes the degradation in chamfering efficiency during actual mass production, thereby negatively affecting the yield.

Furthermore, the replicated diffractive optical element depends on the performance of the master, and if a defect occurs during the manufacture of the master, there has been a problem in that the defect of the master is also replicated to the diffractive optical element as it is.

DISCLOSURE

Technical Problem

An object of the present disclosure is to provide a prism configured to manufacture a diffractive optical element.

Another object of the present disclosure is to provide an apparatus and method for manufacturing a diffractive optical element with a single light source without a master by using a prism.

However, the problems to be solved by the present disclosure are not limited to the above-mentioned problems, and other problems not mentioned will be clearly understood by those skilled in the art from the following description.

Technical Solution

According to an aspect of the present disclosure, there is provided a prism for manufacturing a diffractive optical element, the prism including: a photoreactive material attachment surface; and a light reflecting surface inclined at a predetermined angle from the photoreactive material attachment surface.

In the prism for manufacturing a diffractive optical element according to one embodiment of the present disclosure, the predetermined angle between the photoreactive material attachment surface and the light reflecting surface may be determined by Equation 1 below.

$$\theta_p = \frac{\left[\sin^{-1}\left(\frac{n_{pp}}{n_p}\sin\theta_d\right) - \sin^{-1}\left(\frac{n_{pp}}{n_p}\sin\theta_t\right)\right]}{2} \quad \text{[Equation 1]}$$

where θp is an angle between the photoreactive material attachment surface and the light reflecting surface of the prism, θt is a first incident angle at which irradiated light is refracted at the interface between air and the photoreactive material and is incident into the photoreactive material when irradiated light is irradiated toward the photoreactive material from the opposite side of the prism with respect to a photoreactive material attached to the prism, θd is a second incident angle at which, when the irradiated light transmits the photoreactive material, reflected light reflected from the light reflecting surface is refracted at the interface between the prism and the photoreactive material and is incident into the photoreactive material, npp is a refractive index of the photoreactive material, and np corresponds to a refractive index of the prism.

When irradiated light is irradiated toward the photoreactive material from the opposite side of the prism with respect to the photoreactive material attached to the prism for manufacturing a diffractive optical element according to one embodiment of the present disclosure, the first incident angle θt at which the irradiated light is refracted at the interface between air and the photoreactive material and is incident into the photoreactive material may be equal to or less than a total reflection angle θc between the photoreactive material and air, and the second incident angle θd at which, when the irradiated light transmits the photoreactive material, reflected light reflected from the light reflecting surface is refracted at the interface between the prism and the photoreactive material and is incident into the photoreactive material may be equal to or more than the total reflection angle θc.

In the prism for manufacturing a diffractive optical element according to one embodiment of the present disclosure, the predetermined angle between the photoreactive material attachment surface and the light reflecting surface may be determined by Equation 2 below.

$$\theta_p = \frac{\left[\sin^{-1}\left(\frac{n_{pp}}{n_p}\sin\theta_d\right) - \sin^{-1}\left(\frac{n_{air}}{n_p}\sin\theta_i\right)\right]}{2} \quad \text{[Equation 2]}$$

where θp is an angle between the photoreactive material attachment surface and the light reflecting surface of the prism, θf is an irradiation angle at which irradiated light is incident to the interface between air and the photoreactive material when the irradiated light is irradiated toward the photoreactive material from the opposite side of the prism with respect to a photoreactive material attached to the prism, θd is a second incident angle at which, when the irradiated light transmits the photoreactive material, reflected light reflected from the light reflecting surface is refracted at the interface between the prism and the photoreactive material and is incident into the photoreactive material, npp is a refractive index of the photoreactive material, np is a refractive index of the prism, and nair corresponds to a refractive index of air.

The light reflecting surface of the prism for manufacturing a diffractive optical element according to one embodiment of the present disclosure may include a mirror coating surface or a mirror deposition surface.

The prism for manufacturing a diffractive optical element according to one embodiment of the present disclosure may have a triangular pole shape.

According to another aspect of the present disclosure, there is provided apparatus for manufacturing an a diffractive optical element, the apparatus including: a prism including a photoreactive material attachment surface and a light reflecting surface inclined at a predetermined angle from the photoreactive material attachment surface; and a light source positioned at the opposite side of the prism with respect to a photoreactive material attached to the photoreactive material attachment surface, and configured to irradiate light toward the photoreactive material.

In the apparatus for manufacturing a diffractive optical element according to the embodiment of the present disclosure, an interference fringe may be formed on the photoreactive material by allowing irradiated light, which is irradiated from the light source and refracted at the interface between air and the photoreactive material and is then incident into the photoreactive material, to interfere with reflected light in which, when the irradiated light transmits the photoreactive material, the reflected light is reflected from the light reflecting surface and refracted at the interface between the prism and the photoreactive material, and is incident into the photoreactive material.

In the prism of the apparatus for manufacturing a diffractive optical element according to the embodiment of the present disclosure, a predetermined angle between the photoreactive material attachment surface and the light reflecting surface may be determined by Equation 1 below.

$$\theta_p = \frac{\left[\sin^{-1}\left(\frac{n_{pp}}{n_p}\sin\theta_d\right) - \sin^{-1}\left(\frac{n_{pp}}{n_p}\sin\theta_t\right)\right]}{2} \quad \text{[Equation 1]}$$

where θp is an angle between the photoreactive material attachment surface and the light reflecting surface of the prism, θt is a first incident angle at which irradiated light is refracted at the interface between air and the photoreactive material and is incident into the photoreactive material when irradiated light is irradiated toward the photoreactive material from the opposite side of the prism with respect to a photoreactive material attached to the prism, θd is a second incident angle at which, when the irradiated light transmits the photoreactive material, reflected light reflected from the light reflecting surface is refracted at the interface between the prism and the photoreactive material and is incident into the photoreactive material, npp is a refractive index of the photoreactive material, and np corresponds to a refractive index of the prism.

In the apparatus for manufacturing a diffractive optical element according to the embodiment of the present disclosure, the first incident angle θt at which the irradiated light irradiated from the light source is refracted at the interface between air and the photoreactive material and is incident into the photoreactive material may be equal to or less than a total reflection angle θc between the photoreactive material and air, and the second incident angle θd at which, when the irradiated light transmits the photoreactive material, the reflected light reflected from the light reflecting surface is refracted at the interface between the prism and the photoreactive material and is incident into the photoreactive material may be equal to or more than the total reflection angle θc.

In the prism of the apparatus for manufacturing a diffractive optical element according to the embodiment of the present disclosure, the predetermined angle between the photoreactive material attachment surface and the light reflecting surface may be determined by Equation 2 below.

$$\theta_p = \frac{\left[\sin^{-1}\left(\frac{n_{pp}}{n_p}\sin\theta_d\right) - \sin^{-1}\left(\frac{n_{air}}{n_p}\sin\theta_i\right)\right]}{2} \quad \text{[Equation 2]}$$

where Op is an angle between the photoreactive material attachment surface and the light reflecting surface of the prism, θi is an irradiation angle at which irradiated light is incident to the interface between air and the photoreactive material when irradiated light is irradiated toward the photoreactive material from the opposite side of the prism with respect to a photoreactive material attached to the prism, θd is a second incident angle at which, when the irradiated light transmits the photoreactive material, reflected light reflected from the light reflecting surface is refracted at the interface between the prism and the photoreactive material and is incident into the photoreactive material, npp is a refractive index of the photoreactive material, np is a refractive index of the prism, and nair corresponds to a refractive index of air.

The apparatus for manufacturing a diffractive optical element according to the embodiment of the present disclosure may further include a transport mechanism configured to transport the photoreactive material or the prism so that the photoreactive material is attached to the photoreactive material attachment surface of the prism.

In the apparatus for manufacturing a diffractive optical element according to the embodiment of the present disclosure, the photoreactive material may be formed in the form of a sheet having a predetermined size in the width direction and extending in the length direction, and the transport mechanism may include a transport roll configured to continuously transport the sheet of the photoreactive material.

The photoreactive material attachment surface of the prism of the apparatus for manufacturing a diffractive optical element according to the embodiment of the present disclosure may have a size corresponding to the width direction size of the photoreactive material.

In the apparatus for manufacturing a diffractive optical element according to the embodiment of the present disclosure, an interference fringe may be continuously formed along any one of a width direction, a length direction, and an oblique direction of the photoreactive material, the oblique direction forming a predetermined angle with the width direction or the length direction.

According to still another aspect of the present disclosure, there is provided an apparatus for manufacturing a diffractive optical element, the apparatus including a prism including a photoreactive material attachment surface and a light reflecting surface inclined at a predetermined angle from the photoreactive material attachment surface, and a light source positioned at the opposite side of the prism with respect to the photoreactive material attached to the photoreactive material attachment surface, and configured to irradiate light toward the photoreactive material, wherein a diffractive optical element may be manufactured with only one light source without a master by allowing irradiated light, irradiated from the light source, to interfere with reflected light in which, when the irradiated light transmits the photoreactive material, the reflected light is reflected from light reflecting surface.

According to yet another aspect of the present disclosure, there is provided a method for manufacturing a diffractive optical element, the method comprising steps of: preparing a prism including a photoreactive material attachment surface and a light reflecting surface inclined at a predetermined angle from the photoreactive material attachment surface; attaching a photoreactive material, on which an interference fringe is to be recorded, to the prism; and recording an interference fringe by irradiating light toward the photoreactive material from a light source positioned at the opposite side of the prism with respect to the photoreactive material.

In the step of preparing the prism in the method for manufacturing a diffractive optical element according to the embodiment of the present disclosure, the predetermined angle between the photoreactive material attachment surface and the light reflecting surface of the prism may be determined by Equation 1 below.

$$\theta_p = \frac{\left[\sin^{-1}\left(\frac{n_{pp}}{n_p}\sin\theta_d\right) - \sin^{-1}\left(\frac{n_{pp}}{n_p}\sin\theta_t\right)\right]}{2} \quad \text{[Equation 1]}$$

where θp is an angle between the photoreactive material attachment surface and the light reflecting surface of the prism, θt is a first incident angle at which irradiated light is refracted at the interface between air and the photoreactive material and is incident into the photoreactive material when irradiated light is irradiated toward the photoreactive material from the opposite side of the prism with respect to a photoreactive material attached to the prism, θd is a second incident angle at which, when the irradiated light transmits the photoreactive material, reflected light reflected from the light reflecting surface is refracted at the interface between the prism and the photoreactive material and is incident into the photoreactive material, npp is a refractive index of the photoreactive material, and np corresponds to a refractive index of the prism.

In the step of preparing the prism in the method for manufacturing a diffractive optical element according to the embodiment of the present disclosure, the predetermined angle between the photoreactive material attachment surface and the light reflecting surface of the prism may be determined by Equation 2 below.

$$\theta_p = \frac{\left[\sin^{-1}\left(\frac{n_{pp}}{n_p}\sin\theta_d\right) - \sin^{-1}\left(\frac{n_{air}}{n_p}\sin\theta_i\right)\right]}{2} \quad \text{[Equation 2]}$$

where θp is an angle between the photoreactive material attachment surface and the light reflecting surface of the prism, θi is an irradiation angle at which irradiated light is incident to the interface between air and the photoreactive material when irradiated light is irradiated toward the photoreactive material from the opposite side of the prism with respect to a photoreactive material attached to the prism, θd is a second incident angle at which, when the irradiated light transmits the photoreactive material, reflected light reflected from the light reflecting surface is refracted at the interface between the prism and the photoreactive material and is incident into the photoreactive material, npp is a refractive index of the photoreactive material, np is a refractive index of the prism, and nair corresponds to a refractive index of air.

In the step of recording the interference fringe in the method for manufacturing a diffractive optical element according to the embodiment of the present disclosure, an interference fringe may be formed on the photoreactive material by allowing irradiated light, which is irradiated from the light source and refracted at the interface between air and the photoreactive material, and is then incident into the photoreactive material, to interfere with reflected light in which, when the irradiated light transmits the photoreactive material, reflected light is reflected from the light reflecting surface and refracted at the interface between the prism and the photoreactive material, and is incident into the photoreactive material.

In the step of recording the interference fringe in the method for manufacturing a diffractive optical element according to the embodiment of the present disclosure, the first incident angle θt at which the irradiated light the light source is refracted at the irradiated from interface between air and the photoreactive material and is incident into the photoreactive material may be equal to or less than a total reflection angle θc between the photoreactive material and air, and the second incident angle θd at which, when the irradiated light transmits the photoreactive material, reflected light reflected from the light reflecting surface is refracted at the interface between the prism and the photoreactive material and is incident into the photoreactive material may be equal to or more than the total reflection angle θc.

In the step of recording the interference fringe in the method for manufacturing a diffractive optical element according to the embodiment of the present disclosure, an interference fringe may be continuously formed along any one of a width direction, a length direction, and an oblique direction of the photoreactive material, the oblique direction forming a predetermined angle with the width direction or the length direction.

The method for manufacturing a diffractive optical element according to the embodiment of the present disclosure may further comprise a step of transporting the photoreactive material or the prism so that the photoreactive material is attached to the photoreactive material attachment surface of the prism.

In the method for manufacturing a diffractive optical element according to the embodiment of the present disclosure, the photoreactive material may be formed in the form of a sheet having a predetermined size in the width direction and extending in the length direction, and the sheet of the photoreactive material may be continuously transported in the step of transporting the photoreactive material.

The method for manufacturing a diffractive optical element according to the embodiment of the present disclosure may further comprise a step of cutting a plurality of diffractive optical elements having a predetermined size along any one of a width direction, a length direction, and an oblique direction of the photoreactive material on which the interference fringe is recorded, the oblique direction forming a predetermined angle with the width direction or the length direction.

The diffractive optical element manufactured by the method for manufacturing a diffractive optical element according to the embodiment of the present disclosure may be a holographic optical element.

A photoreactive material on which an interference fringe is recorded by allowing irradiated light, irradiated from the light source by the apparatus for manufacturing a diffractive optical element according to the embodiment of the present disclosure, to interfere with reflected light in which, when irradiated light transmits the photoreactive material, reflected light is reflected from the light reflecting surface may be formed in the form of a sheet, and the interference fringe may be continuously formed along any one of a width direction, a length direction, and an oblique direction of the photoreactive material, the oblique direction forming a predetermined angle with the width direction or the length direction.

A photoreactive material on which an interference fringe is recorded by the method for manufacturing a diffractive optical element according to the embodiment of the present disclosure may be formed in the form of a sheet, and the interference fringe may be continuously formed along any one of a width direction, a length direction, and an oblique direction of the photoreactive material, the oblique direction forming a predetermined angle with the width direction or the length direction.

Advantageous Effects

According to the present disclosure, it is possible to manufacture a diffractive optical element with one light source without a master irradiated light, irradiated from a light source, to interfere with reflected light, reflected from a light reflecting surface of a prism, using the prism having the light reflecting surface.

Accordingly, it is not necessary to continuously produce the master, which is a consumable, and it is possible to prevent a case in which a defect of the master is copied as it is in the diffractive optical element.

Further, the apparatus for manufacturing a diffractive optical element according to the present disclosure can be implemented as a roll-to-roll apparatus, thereby mass-producing a diffractive optical element having uniform performance.

Further, since the prism of the apparatus for manufacturing a diffractive optical element according to the present disclosure can be manufactured in a large area, the chamfering efficiency can be improved during mass production of the diffractive optical element.

Meanwhile, since, when manufacturing a diffractive optical element using a conventional tile attachment-type master, no interference fringe is recorded in the gap between the masters so that an intermittent interference fringe is formed on the photoreactive material, the cutting efficiency is reduced when performing cutting, especially when performing oblique cutting.

On the contrary, according to the present disclosure, it is possible to continuously form the interference fringe on the photoreactive material, thereby greatly improving the cutting efficiency.

Effects of the present disclosure are not limited to the above-described effects, and effects not mentioned will be clearly understood by those skilled in the art from the present specification and accompanying drawings.

BRIEF DESCRIPTION OF DRAWINGS

FIG. 1 is a diagram illustrating the concept of manufacturing a diffractive optical element according to one embodiment of the present disclosure.

FIG. 2 is a cross-sectional view illustrating an optical path of irradiated light in an apparatus for manufacturing a diffractive optical element according to one embodiment of the present disclosure.

FIG. 3 is a perspective view illustrating a prism of the apparatus for manufacturing a diffractive optical element according to the embodiment of the present disclosure.

FIG. 4 is a schematic diagram illustrating an apparatus for manufacturing a diffractive optical element according to another embodiment of the present disclosure.

FIG. 5A is a graph showing transmittance according to the wavelength of a diffractive optical element manufactured according to an Example of the present disclosure.

FIG. 5B is a graph showing reflectance according to the wavelength of the diffractive optical element manufactured according to the Example of the present disclosure.

FIG. 6A is a graph showing transmittance according to the wavelength of a diffractive optical element manufactured according to a Comparative Example of the present disclosure.

FIG. 6B is a graph showing reflectance according to the wavelength of the diffractive optical element manufactured according to the Comparative Example of the present disclosure.

EXPLANATION OF REFERENCE NUMERALS

1: Apparatus for manufacturing a diffractive optical element
2: Photoreactive material
10: Prism for manufacturing a diffractive optical element
11: Photoreactive material attachment surface
12: Light reflecting surface
20: light source
30: Transport mechanism
40: Supply roll 50: Recovery roll
La: Irradiated light
Lb: Reflected light
θp: Angle between photoreactive material attachment surface and light reflecting surface of prism

MODE FOR INVENTION

The present disclosure will become apparent with reference to embodiments described below in detail in conjunction with the accompanying drawings. However, the present disclosure is not limited to the embodiments disclosed below, but will be implemented in various different forms. These embodiments are only provided to allow the disclosure of the present disclosure to be complete and to fully inform a person of ordinary skill in the art to which the present disclosure pertains of the scope of the present disclosure, and the present disclosure is only defined by the scope of the claims. Meanwhile, the terms used in the present specification are for describing the embodiments and are not intended to limit the present disclosure.

Throughout present specification, the singular form also includes the plural form unless the phrase specifically dictates otherwise.

The terms "comprise/include" and/or "comprising/including" are used throughout the present specification to indicate that a named constituent element, step, operation, and/or element is present, without precluding the presence or addition of one or more other constituent elements, steps, operations, and/or elements. Unless specifically stated otherwise, these terms mean that another constituent element may further be included, but not excluded.

Throughout the present specification, terms such as first, second, etc. may be used to describe various elements, but the elements should not be limited by the terms. The terms are used only for the purpose of distinguishing one component from another component.

Throughout the present specification, the term "diffractive optical element" means an optical element having a diffraction grating pattern in which high refractive portions and low refractive portions are alternately disposed along a predetermined direction, and light reaching the diffractive optical element may be diffracted so that the optical path thereof is changed.

Throughout the present specification, the term "holographic diffractive optical element" refers to an optical element having a holographic grating pattern in which high refractive portions and low refractive portions are alternately disposed along a predetermined direction, and light reaching the holographic diffractive optical element may be diffracted so that the optical path thereof is changed. Such a holographic grating pattern may be recorded by allowing a plurality of lasers to interfere with each other on a photosensitive material such as a photopolymer.

Hereinafter, the present disclosure will be described in more detail.

FIGS. 1 to 4 illustrate the configuration and operation of an apparatus for manufacturing a diffractive optical element according to one embodiment of the present disclosure, FIG. 1 is a diagram illustrating the concept of manufacturing a diffractive optical element according to one embodiment of the present disclosure, FIG. 2 is a cross-sectional view illustrating an optical path of irradiated light in an apparatus for manufacturing a diffractive optical element, FIG. 3 is a perspective view illustrating a prism of the apparatus for manufacturing a diffractive optical element, and FIG. 4 is a schematic diagram illustrating an apparatus for manufacturing a diffractive optical element.

An apparatus 1 for manufacturing a diffractive optical element according to one embodiment of the present disclosure will be described with reference to FIGS. 1 to 4. The apparatus 1 for manufacturing a diffractive optical element according to one embodiment of the present disclosure may manufacture the diffractive optical element by irradiating light to a photoreactive material 2 and allowing light to interfere with the photoreactive material 2, thereby recording an interference fringe.

The apparatus 1 for manufacturing a diffractive optical element according to the embodiment of the present disclosure is configured to include a light source 20 configured to irradiate light to the photoreactive material 2 and a prism 10 configured to interfere with light irradiated from the light source 20.

More specifically, the prism 10 for manufacturing a diffractive optical element may be configured to include a photoreactive material attachment surface 11 onto which the photoreactive material 2 is attached and a light reflecting surface inclined by a predetermined angle θp from the photoreactive material attachment surface 11.

The light source 20 may be located at the opposite side of the prism 10 with respect to the photoreactive material 2 attached to the photoreactive material attachment surface 11 and may be configured to irradiate light toward the photoreactive material 2.

As illustrated in FIG. 1, the apparatus 1 for manufacturing a diffractive optical element according to the embodiment of the present disclosure may manufacture the diffractive optical element with only one light source without a master by irradiating light to the photoreactive material 2 attached to the prism 10 and allowing irradiated light La, irradiated from the light source 20, to interfere with reflected light Lb in which, when irradiated light La transmits the photoreactive material 2, reflected light is reflected from the light reflecting surface 12, thereby recording an interference fringe on the photoreactive material 2.

An optical path for recording an interference fringe on the photoreactive material 2 using the apparatus 1 for manufacturing a diffractive optical element according to the embodiment of the present disclosure will be described with reference to FIG. 2. The irradiated light La irradiated at a predetermined irradiation angle θi from the light source 20 is refracted at t interface between air and the photoreactive material 2 and is incident into the photoreactive material 2, and an incident angle at this time may be referred to as a first incident angle θt.

After transmitting the photoreactive material 2 and being reflected from the light reflecting surface 12, the irradiated light La is refracted at the interface between the prism 10 and the photoreactive material 2 and is then incident into the photoreactive material 2. Light after being reflected from the light reflecting surface 12 will be referred to as the reflected light Lb, and an incident angle at this time may be referred to as a second incident angle θd.

On the other hand, the irradiated light La and the reflected light Lb are lights generated from one light source 20, and after the irradiated light La is reflected from the light reflecting surface 12 of the prism 10, the irradiated light La becomes the reflected light Lb. The irradiated light La and the reflected light Lb interfere with each other to form an interference fringe on the photoreactive material 2, thereby making it possible to manufacture a diffractive optical element.

In the apparatus 1 for manufacturing a diffractive optical element according to the embodiment of the present disclosure, in order to form an interference fringe by allowing the irradiated light La, irradiated from the light source 20, to interfere with the reflected light Lb reflected from the light reflecting surface 12 of the prism 10 along an optical path, it is preferable that the first incident angle θt when the irradiated light La is refracted at the interface between air and the photoreactive material 2 and is incident into the photoreactive material 2 and the second incident angle θd when reflected light Lb is refracted at the interface between the prism 10 and the photoreactive material 2 and is incident into the photoreactive material 2 each satisfies a predetermined relationship with a total reflection angle θc between the photoreactive material 2 and air.

Specifically, if the first incident angle θt becomes equal to or less than the total reflection angle θc and the second incident angle θd becomes equal to or more than the total reflection angle θc, the irradiated light La and reflected light Lb may interfere with each other within the photoreactive material 2 to form an interference fringe.

From another point of view, in order to adjust the angles of two lights that need to be incident into the photoreactive material 2 to manufacture a diffractive optical element, the angle of the prism 10, that is, the angle between the photoreactive material attachment surface 11 and the light reflecting surface 12 of the prism 10 may be determined by [Equation 1] below.

$$\theta_p = \frac{\left[\sin^{-1}\left(\frac{n_{pp}}{n_p}\sin\theta_d\right) - \sin^{-1}\left(\frac{n_{pp}}{n_p}\sin\theta_t\right)\right]}{2} \quad \text{[Equation 1]}$$

where θp is an angle between the photoreactive material attachment surface 11 and the light reflecting surface 12 of the prism 10, θt is the first incident angle at which irradiated light La irradiated from the light source 20 is refracted at the interface between air and the photoreactive material 2 and is incident into the photoreactive material 2, θd is the second incident angle at which, when the irradiated light La transmits the photoreactive material 2, reflected light Lb reflected from the light reflecting surface 12 is refracted at the interface between the prism 10 and the photoreactive material 2 and is incident into the photoreactive material 2, npp is a refractive index of the photoreactive material 2, and np corresponds to a refractive index of the prism 10.

If an angle at which irradiated light irradiated from the light source 20 is incident to the interface between air and the photoreactive material is defined as an irradiation angle θi, the first incident angle θt may be replaced by the irradiation angle θi using Snell's law, and [Equation 1] is changed as shown in [Equation 2] below so that the angle θp of the prism 10 may be shown as the relationship between the irradiation angle of and the second incident angle θd.

$$\theta_p = \frac{\left[\sin^{-1}\left(\frac{n_{pp}}{n_p}\sin\theta_d\right) - \sin^{-1}\left(\frac{n_{air}}{n_p}\sin\theta_i\right)\right]}{2} \quad \text{[Equation 2]}$$

where op is an angle between the photoreactive material attachment surface 11 and the light reflecting surface 12 of the prism 10, θi is an irradiation angle at which the irradiated light La irradiated from the light source 20 is incident to the interface between air and the photoreactive material 2, θd is a second incident angle at which, when the irradiated light La transmits the photoreactive material 2, reflected light Lb reflected from the light reflecting surface 12 is refracted at the interface between the prism 10 and the photoreactive material 2 and is incident into the photoreactive material 2, npp is a refractive index of the photoreactive material 2, np is a refractive index of the prism 10, and "a" corresponds to a refractive index of air.

The light reflecting surface 12 of the prism 10 for manufacturing a diffractive optical element according to the embodiment of the present disclosure may be configured to mirror-reflect light that is incident into the prism 10 after transmitting the photoreactive material attachment surface 11, and to form a mirror coating surface or a mirror deposition surface through coating or deposition, but the present disclosure is not limited thereto. The light reflecting surface 12 may also be implemented by attaching a reflectable optical element to the prism 10, and any configuration is possible as long as it can reflect light that is incident into the prism 10 and reaches the light reflecting surface 12.

As illustrated in FIG. 3, the prism 10 for manufacturing a diffractive optical element according to the embodiment of the present disclosure may have a triangular pole shape, and one side surface of the triangular pole may become the photoreactive material attachment surface 11, and the other side surface adjacent thereto may become the light reflecting surface 12. However, the present disclosure is not limited thereto, and any configuration is possible as long as it satisfies a predetermined angular relationship with the photoreactive material attachment surface 11 and includes the light reflecting surface 12 adjacent thereto.

The prism 10 for manufacturing a diffractive optical element according to the embodiment of the present disclosure may be made of quartz, BK7, or poly(methyl methacrylate) (PMMA), but is not limited thereto.

In the apparatus 1 for manufacturing a diffractive optical element according to the embodiment of the present disclosure, the light source 20 may be a laser beam source, and may be configured to irradiate one light having a predetermined wavelength and a coherent length.

Here, the meaning of "one" may mean that the irradiated light La and the reflected light Lb are generated by the "same" light source in addition to the meaning that the light source is physically one.

According to the embodiment of the present disclosure, the photoreactive material may include a photosensitive material, and may be formed in various shapes such as a sheet shape or a roll shape having a predetermined width and/or length direction size. Various types of photosensitive materials that can be used in the manufacture of a diffractive optical element including a holographic optical element have been publicly known, and these materials can be used even in the present disclosure without limitation.

According to the embodiment of the present disclosure, a photopolymer, a photoresist, a silver halide emulsion, a dichromated gelatin, a photographic emulsion, a photothermoplastic material, or a photorefractive material may be used as the photosensitive material. An interference fringe can be easily recorded using the above-mentioned photosensitive materials.

A diffractive optical element manufactured according to the embodiment of the present disclosure may be a holographic optical element.

An apparatus 1 for manufacturing a diffractive optical element according to the embodiment of the present disclosure may be configured as a roll-to-roll apparatus to mass-produce the diffractive optical element.

This will be described in more detail with reference to FIG. 4.

In the apparatus 1 for manufacturing a diffractive optical element according to the embodiment of the present disclosure, a photoreactive material 2 may be formed in the form of a sheet having a predetermined size in the width direction and extending in the length direction. At this time, the width direction size of the photoreactive material 2 may be configured to be 500 mm or more, but is not limited thereto, and may be variously set according to the size of a diffractive optical element to be produced.

The sheet-shaped photoreactive material 2 may be supplied by a supply roll 40 wound in a roll shape, and the sheet-shaped photoreactive material 2 which has the interference fringe recorded thereon and manufactured as a diffractive optical element nay be wound by a recovery roll 50 to be recovered in the form of a roll.

When the sheet-shaped photoreactive material 2 is supplied to the apparatus 1 for manufacturing a diffractive optical element, a transport mechanism 30 configured to transport the photoreactive material 2 so that the photoreactive material 2 is attached to a photoreactive material attachment surface 11 of a prism 10 may be installed, and the transport mechanism 30 may be configured in the form of a transport roll that continuously transports a sheet of the photoreactive material 2.

The transport mechanism 30 may also be configured to transport the prism 10 in addition to the photoreactive material 2.

Further, the photoreactive material attachment surface 11 of the prism 10 for manufacturing a diffractive optical element according to the embodiment of the present disclosure may be configured to correspond to the width direction size of the sheet-shaped photoreactive material 2.

With this configuration, the chamfering efficiency during the production of a diffractive optical element from the photoreactive material 2 can be greatly improved compared to the case of using the master, which is the conventional art, and thus it is effective.

The master of the conventional art cannot be manufactured in a large area due to laser and optical limitations, so that for mass production, several masters had to be attached to a substrate in a tile manner for use. In this way, when several masters are attached in a tile manner, there has been a problem in that the chamfering efficiency is lowered during the production of a diffractive optical element.

On the other hand, since the prism 10 for manufacturing a diffractive optical element according to the embodiment of the present disclosure can be manufactured in a large area with a side length of 500 mm or more, the prism 10 may prevent reduction in chamfering efficiency that occurs when several masters are attached in a tile manner as in the conventional art.

The sheet-shaped photoreactive material 2 on which the interference fringe is recorded by the prism 10 may be subjected to a process of cutting the sheet-shaped photoreactive material 2 into individual diffractive optical elements each having a predetermined size.

Such cutting may be performed in a width direction, a length direction, or an oblique direction of the sheet-shaped photoreactive material 2, the oblique direction forming a predetermined angle with the width direction or the length direction.

Here, it is necessary to efficiently cut the sheet-shaped photoreactive material 2 so that as many individual diffractive optical elements are disposed as possible within the unit size of the sheet-shaped photoreactive material 2, for example, 500 mm×500 mm.

The sum of the areas of the individual diffractive optical elements disposed with respect to the unit area of the sheet-shaped photoreactive material 2 is defined as cutting efficiency, and the production yield may be increased by improving the cutting efficiency.

The cutting efficiency of the diffractive optical element manufactured according to the embodiment of the present disclosure is higher than the cutting efficiency of the diffractive optical element manufactured using the conventional tile attachment-type master, and particularly, in the case of oblique direction cutting, the difference in cutting efficiency between the two inventions becomes much larger.

When the conventional tile attachment-type master is used, a physical gap occurs between the masters as the masters are attached to a master plate in a tile manner. An interference fringe cannot be recorded in such a physical gap so that the interference fringe recorded on the photoreactive material sheet before being cut is not continuously formed, but the interference fringe is intermittently recorded in the gap between the masters.

Such an intermittent interference fringe has an adverse effect on increasing the cutting efficiency.

Meanwhile, according to the embodiment of the present disclosure, since an interference fringe may be continuously recorded on the sheet-shaped photoreactive material 2, it is possible to obtain significantly improved cutting efficiency compared to the conventional art.

According to the embodiment of the present disclosure, an interference fringe may be continuously formed along a width direction, a length direction, or an oblique direction of the sheet-shaped photoreactive material 2, the oblique direction forming a predetermined angle with the width direction or the length direction, and individual diffractive optical elements may be disposed and cut using the entire region within the unit size of the sheet-shaped photoreactive material 2.

According to still another embodiment of the present disclosure, a method for manufacturing a diffractive optical element comprises steps of: preparing a prism 10 including a photoreactive material attachment surface 11 and a light reflecting surface 12 inclined at a predetermined angle θp from the photoreactive material attachment surface 11; attaching a photoreactive material 2, on which an interference fringe is to be recorded, to the prism 10; and recording an interference fringe by irradiating light toward the photoreactive material 2 from a light source 20 positioned at the opposite side of the prism 10 with respect to the photoreactive material 2.

In the step of preparing the prism 10, the prism 10 may have the same configuration as those of the apparatuses 1 for manufacturing a diffractive optical element according to the previous embodiments.

In the step of recording the interference fringe after the step of attaching the photoreactive material 2 to the prism 10, irradiated light La which is irradiated from the light source 20 and refracted at the interface between air and the photoreactive material 2, and is then incident into the photoreactive material 2, and reflected light Lb in which, when irradiated light La transmits the photoreactive material 2, reflected light Lb is reflected from the light reflecting surface 12 and refracted at the interface between the prism 10 and the photoreactive material 2, and is incident into the photoreactive material 2 may interfere with each other to form an interference fringe on the photoreactive material 2.

The method for manufacturing a diffractive optical element according to the embodiment of the present disclosure may further comprise a step of transporting the photoreactive material 2 or the prism 10 such that the photoreactive material 2 is attached to the photoreactive material attachment surface 11 of the prism 10, which makes it possible to continuously supply the photoreactive material 2 to manufacture a diffractive optical element.

In this case, the photoreactive material 2 may be configured in a sheet shape having a predetermined width direction size and extending in the length direction, so that the sheet of the photoreactive material may be continuously transported.

The method for manufacturing a diffractive optical element according to the embodiment of the present disclosure may comprise a step of cutting the sheet-shaped photoreactive material 2 having an interference fringe recorded thereon into a plurality of diffractive optical elements.

Such cutting may be performed along a width direction, a length direction, or an oblique direction of the sheet-shaped photoreactive material 2, the oblique direction forming a predetermined angle with the width direction or the length direction.

According to the embodiment of the present disclosure, the interference fringe may be continuously recorded on the sheet-shaped photoreactive material 2 in the step of recording the interference fringe.

More specifically, since an interference fringe is continuously formed along a width direction, a length direction, or an oblique direction of the sheet-shaped photoreactive material 2, the oblique direction forming a predetermined angle with the width direction or the length direction, individual diffractive optical elements may be disposed and cut using the entire region within the unit size of the sheet-shaped photoreactive material 2, which makes it possible to improve the cutting efficiency.

EXAMPLE

After the apparatus 1 for manufacturing a diffractive optical element according to the embodiment of the present disclosure was prepared to attach the photoreactive material 2 to the photoreactive material attachment surface 11 of the prism 10, the irradiated light La was incident from the light source 20 at the irradiation angle θi of 60°, and then the second incident angle θd the reflected light Lb, reflected from the light reflecting surface 12 of the prism 10, was set to 66° to allow the irradiated light La to interfere with the reflected light Lb, thereby manufacturing a diffractive optical element.

Here, a laser beam source having a wavelength of 660 nm and a coherent length of 2 m was used as the light source 20, a photopolymer was used as the photoreactive material 2, and θp of the prism 10 was set to 15°.

The optical properties of the manufactured diffractive optical element are shown in FIGS. 5A and 5B.

FIGS. 5A and 5B are graphs obtained by measuring the efficiencies of the diffractive optical element manufactured according to the Example of the present disclosure. FIG. 5A is a graph showing transmittance according to the wavelength of the diffractive optical element manufactured according to the Example of the present disclosure, and FIG. 5B is a graph showing reflectance according to the wavelength of the diffractive optical element manufactured according to the Example of the present disclosure.

According to FIGS. 5A and 5B, when light is incident to the diffractive optical element according to Example of the present disclosure at 0°, it diffracts at 50°, and exhibits a peak wavelength of 986 nm, a transmittance of 39.7%, and a reflectance of 49.9%.

Comparative Example

An apparatus for manufacturing a diffractive optical element according to a Comparative Example of the present disclosure was prepared. Unlike the apparatus for manufacturing a diffractive optical element according to the Example of the present disclosure, a master according to the conventional art, not a prism, was manufactured, and a master plate was manufactured. Configurations other than the master plate were configured in the same manner as in the Example of the present disclosure.

More specifically, a photopolymer was used as the master, and a laser beam source having a wavelength of 660 nm and a coherent length of 2 m was used as the light source, and a master was manufactured by separating the light source into two light sources and allowing the two light sources to interfere with each other.

After the photoreactive material was attached to the photoreactive material attachment surface of the master plate, irradiated light was incident at an irradiation angle of 60° from the light source, and then the incident angle of diffracted light diffracted from the master was set to 66° to allow the irradiated light and the diffracted light to interfere with each other, thereby manufacturing a replicated diffractive optical element identical to the master on a photoreactive material.

Here, a laser beam source having a wavelength of 660 nm and a coherent length of 2 m was used as the light source, and a photopolymer was used as the photoreactive material 2.

The optical properties of the diffractive optical element manufactured according to the Comparative Example are shown in FIGS. 6A and 6B.

FIGS. 6A and 6B are graphs obtained by measuring the efficiencies of the diffractive optical element manufactured according to the Comparative Example of the present disclosure. FIG. 6A is a graph showing transmittance according to the wavelength of the diffractive optical element manufactured according to the Comparative Example of the present disclosure, and FIG. 6B is a graph showing reflectance according to the wavelength of the diffractive optical element manufactured according to the Comparative Example of the present disclosure.

According to FIGS. 6A and 6B, when light is incident to the diffractive optical element according to Comparative Example of the present disclosure at 0°, it diffracts at 50°, and exhibits a peak wavelength of 987 nm, a transmittance of 46.0%, and a reflectance of 44.8%.

Therefore, in comparing the measurement data according to the Example of the present disclosure and the measurement data according to the Comparative Example, the Example can manufacture a diffractive optical element having higher efficiency by about 5% or more than that of the Comparative Example.

Although the present disclosure has been described by limited embodiments, the present disclosure is not limited thereto, and various changes and modifications are of course possible within the technical spirit of the present disclosure and the scope equivalent to the claims to be described below by those of ordinary skill in the art to which the present disclosure pertains.

The invention claimed is:

1. A prism for manufacturing a diffractive optical element, the prism comprising a photoreactive material attachment surface and a light reflecting surface inclined at a predetermined angle relative to the photoreactive material attachment surface, wherein the predetermined angle is determined by Equation 1 or Equation 2 below, $$\theta_p = \frac{\left[\sin^{-1}\left(\frac{n_{pp}}{n_p}\sin\theta_d\right) - \sin^{-1}\left(\frac{n_{pp}}{n_p}\sin\theta_t\right)\right]}{2} \quad \text{[Equation 1]}$$

$$\theta_p = \frac{\left[\sin^{-1}\left(\frac{n_{pp}}{n_p}\sin\theta_d\right) - \sin^{-1}\left(\frac{n_{air}}{n_p}\sin\theta_i\right)\right]}{2} \quad \text{[Equation 2]}$$

where θp is an angle between the photoreactive material attachment surface and the light reflecting surface of the prism, θt is a first incident angle at which irradiated light is refracted at an interface between air and the photoreactive material and is incident into the photoreactive material when irradiated light is irradiated toward the photoreactive material from an opposite side of the prism with respect to a photoreactive material attached to the prism, θd is a second incident angle at which, when the irradiated light passes through the photoreactive material, reflected light reflected from the light reflecting surface is refracted at an interface between the prism and the photoreactive material and is incident into the photoreactive material, npp is a refractive index of the photoreactive material, and np is a refractive index of the prism, θi is an irradiation angle at which irradiated light is incident to an interface between air and the photoreactive material when irradiated light is irradiated toward the photoreactive material from an opposite side of the prism with respect to a photoreactive material attached to the prism, and nair is a refractive index of air.

2. The prism of claim 1, wherein, when irradiated light is irradiated toward the photoreactive material that is attached to the prism, from the opposite side of the prism with respect to the photoreactive material, the first incident angle θt which the irradiated light is refracted at the interface between air and the photoreactive material and is incident into the photoreactive material is equal to or less than a total reflection angle θc between the photoreactive material and air, and the second incident angle θd at which, when the irradiated light passes through the photoreactive material, reflected light reflected from the light reflecting surface is refracted at the interface between the prism and the photoreactive material and is incident into the photoreactive material is equal to or more than the total reflection angle θc.

3. The prism of claim 1, wherein the light reflecting surface comprises a mirror coating surface or a mirror deposition surface.

4. The prism of claim 1, wherein the prism has a triangular pole shape.

5. An apparatus for manufacturing a diffractive optical element, the apparatus comprising:

a prism comprising a photoreactive material attachment surface and a light reflecting surface inclined at a predetermined angle from the photoreactive material attachment surface; and a light source positioned at an opposite side of the prism with respect to a photoreactive material attached to the photoreactive material attachment surface, the light source being configured to irradiate light toward the photoreactive material, wherein the predetermined angle is determined by Equation 1 or Equation 2 below, $$\theta_p = \frac{\left[\sin^{-1}\left(\frac{n_{pp}}{n_p}\sin\theta_d\right) - \sin^{-1}\left(\frac{n_{pp}}{n_p}\sin\theta_t\right)\right]}{2} \quad \text{[Equation 1]}$$

$$\theta_p = \frac{\left[\sin^{-1}\left(\frac{n_{pp}}{n_p}\sin\theta_d\right) - \sin^{-1}\left(\frac{n_{air}}{n_p}\sin\theta_i\right)\right]}{2} \quad \text{[Equation 2]}$$

where θp is an angle between the photoreactive material attachment surface and the light reflecting surface of the prism, θt is a first incident angle at which the irradiated light irradiated from the light source is refracted at an interface between air and the photoreactive material and is incident into the photoreactive material, θd is a second incident angle at which, when the irradiated light passes through the photoreactive material, reflected light reflected from the light reflecting surface is refracted at an interface between the prism and the photoreactive material and is incident into the photoreactive material, npp is a refractive index of the photoreactive material, np is a refractive index of the prism, θi is an irradiation angle at which irradiated light irradiated from the light source is incident to an interface between air and the photoreactive material, nair is a refractive index of air.

6. The apparatus of claim 5, wherein the apparatus is configured to form an interference fringe on the photoreactive material by allowing irradiated light, which is irradiated from the light source and refracted at the interface between air and the photoreactive material; and is incident into the photoreactive material, to interfere with reflected light that is reflected from the light reflecting surface after the irradiated light passes through the photoreactive material, is refracted at the interface between the prism and the photoreactive material, and is incident into the photoreactive material.

7. The apparatus of claim 5, wherein the first incident angle θt at which irradiated light irradiated from the light source is refracted at the interface between air and the photoreactive material and is incident into the photoreactive material is equal to or less than a total reflection angle θc between the photoreactive material and air, and the second incident angle θd at which, when the irradiated light passes through the photoreactive material, reflected light reflected from the light reflecting surface is refracted at the interface between the prism and the photoreactive material and is incident into the photoreactive material is equal to or more than the total reflection angle θc.

8. The apparatus of claim 5, wherein the photoreactive material attachment surface of the prism has a size equal to a width direction size of the photoreactive material.

9. The apparatus of claim 5, wherein the apparatus is configured to continuously form an interference fringe along any one of a width direction, a length direction, and an oblique direction of the photoreactive material, the oblique direction forming a predetermined angle with the width direction or the length direction.

10. The apparatus of claim 5, wherein the apparatus is configured to manufacture a diffractive optical element with only one light source without a master by allowing irradiated light, irradiated from the light source, to interfere with reflected light in which, when irradiated light passes through the photoreactive material, reflected light is reflected from the light reflecting surface.

11. The apparatus of claim 5, further comprising a cutting mechanism configured to cut the photoreactive material into a plurality of diffractive optical elements having a predetermined size along any one of a width direction, a length direction, and an oblique direction of the photoreactive material on which the interference fringe is recorded, the oblique direction forming a predetermined angle with the width direction or the length direction.

12. The apparatus of claim 5, wherein the diffractive optical element is a holographic optical element.

13. The apparatus of claim 5, further comprising a transport mechanism configured to transport the photoreactive material or the prism while the photoreactive material is attached to the photoreactive material attachment surface of the prism.

14. The apparatus of claim 13, wherein the photoreactive material is in the form of a sheet having a predetermined size in a width direction and extending in a length direction, and the transport mechanism comprises a transport roll configured to continuously transport the sheet.

15. A photoreactive material on which an interference fringe is recorded by using an apparatus for manufacturing a diffractive optical element, the apparatus comprising:

a prism comprising a photoreactive material attachment surface and a light reflecting surface inclined at a predetermined angle from the photoreactive material attachment surface; and a light source positioned at an opposite side of the prism with respect to a photoreactive material attached to the photoreactive material attachment surface, the light source being configured to irradiate light toward the photoreactive material, wherein the interference fringe is recorded by allowing irradiated light, irradiated from the light source to interfere with reflected light, the reflected light being reflected from the light reflecting surface after the irradiated light passes through the photoreactive material, wherein the photoreactive material is in the form of a sheet, and wherein the photoreactive material has an interference fringe continuously formed thereon along any one of a width direction, a length direction, and an oblique direction of the photoreactive material, the oblique direction forming a predetermined angle with the width direction or the length direction.

* * * * *